May 20, 1958  M. M. BASON ET AL  2,835,560
CATALYTIC REACTOR
Filed Feb. 23, 1954  2 Sheets-Sheet 1
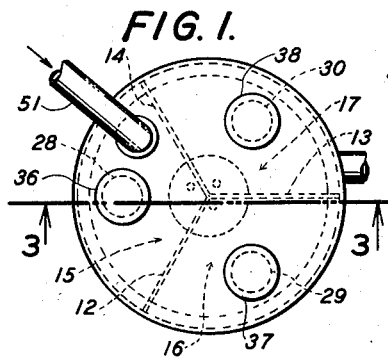
FIG. 1.
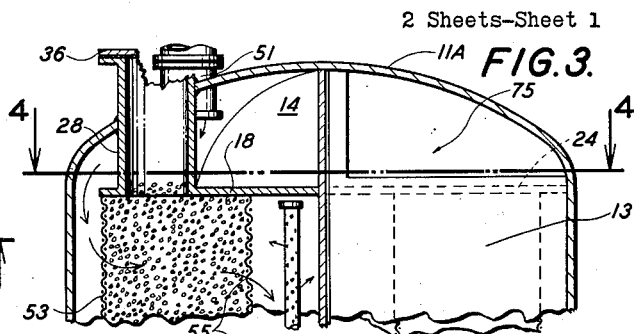
FIG. 3.
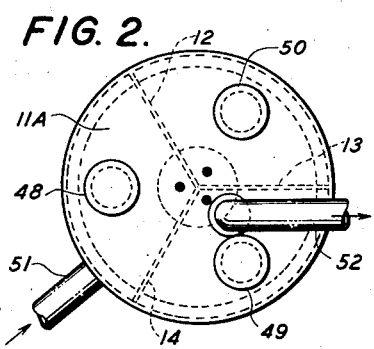
FIG. 2.
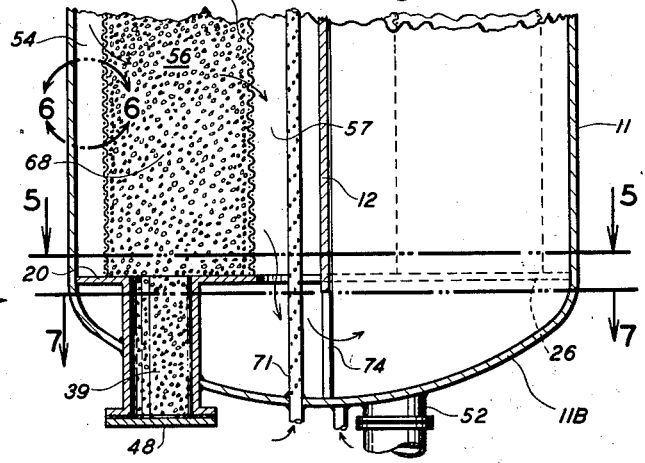
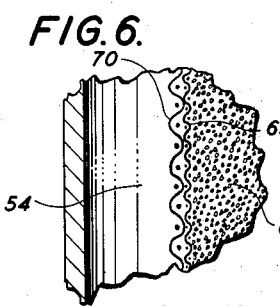
FIG. 6.
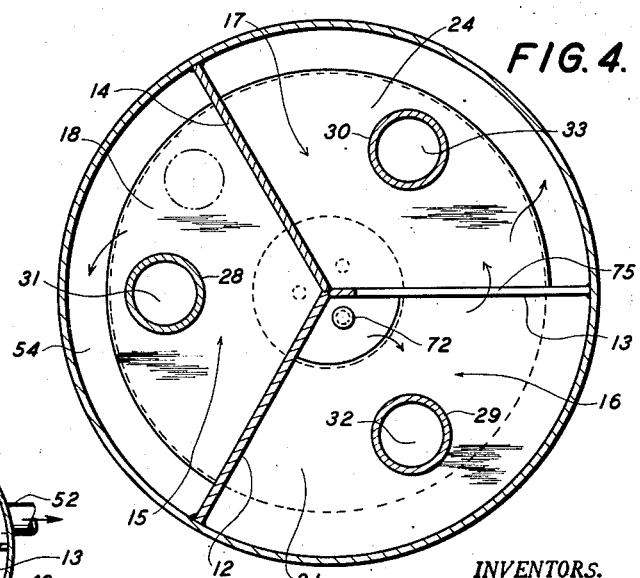
FIG. 4.
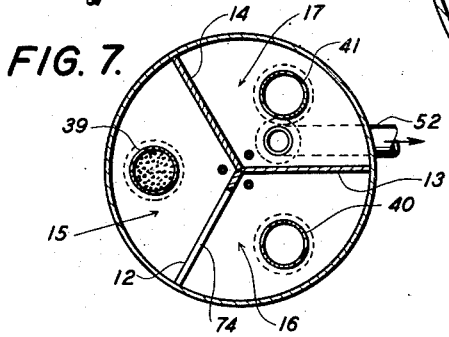
FIG. 7.
INVENTORS.
MERRILL M. BASON
ARNOLD M. AMES
MILTON S. NEHLS
BY James B Christie
ATTORNEY May 20, 1958
M. M. BASON ET AL
2,835,560
CATALYTIC REACTOR
Filed Feb. 23, 1954
2 Sheets-Sheet 2
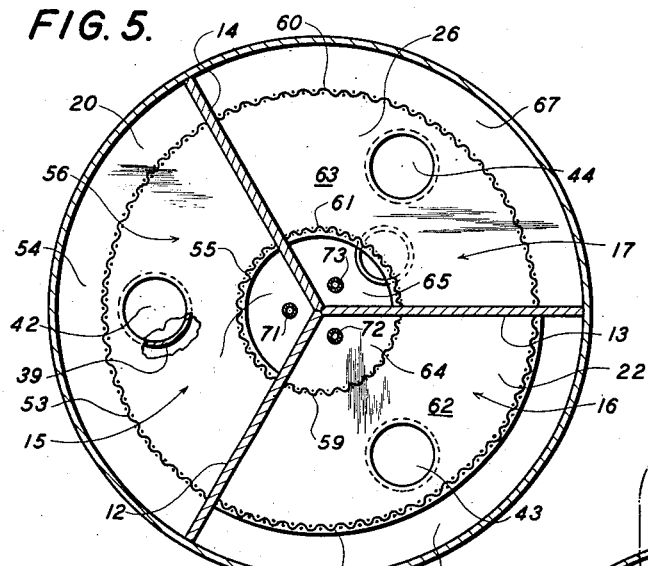
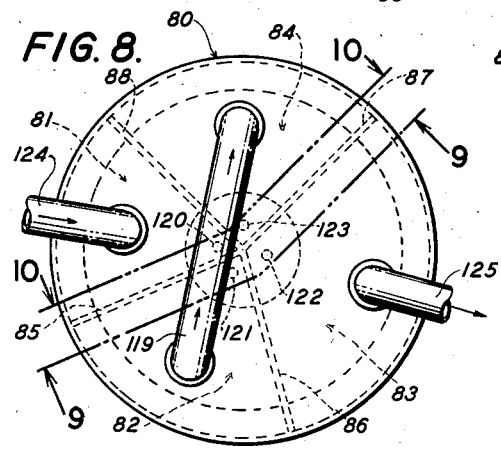
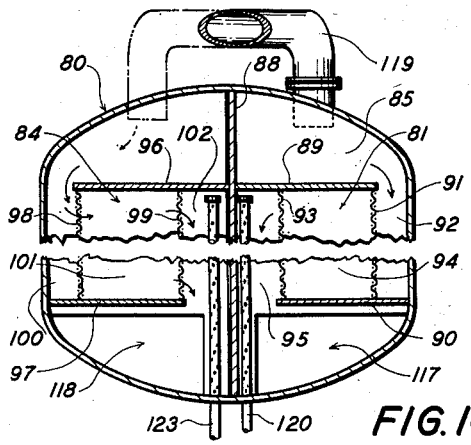
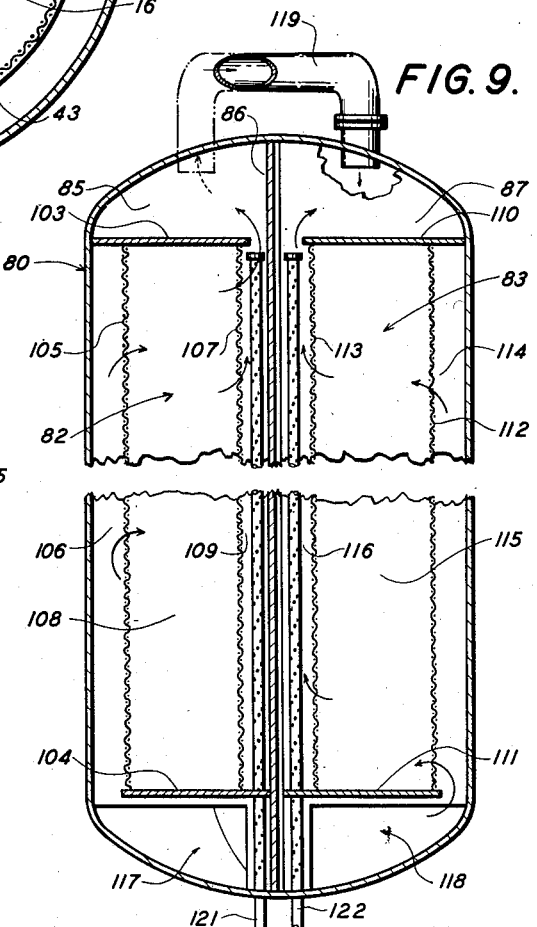
INVENTORS.
MERRILL M. BASON
ARNOLD M. AMES
MILTON S. NEHLS
BY James B. Christie
ATTORNEY United States Patent Office 2,835,560
Patented May 20, 1958

2,835,560

CATALYTIC REACTOR

Merrill M. Bason and Arnold M. Ames, Altadena, and Milton S. Nehls, Pasadena, Calif., assignors to C. F. Braun & Co., a corporation of California Application February 23, 1954, Serial No. 411,902

4 Claims. (Cl. 23—288)

This invention relates to an improved method and apparatus for conducting chemical reactions.

In many types of chemical reactions heat is evolved (exothermic reactions) or consumed (endothermic reactions) in such large quantities that the resulting temperature change causes the reaction to become inefficient. In exothermic reactions the temperature rise is often so pronounced that the catalyst is damaged or destroyed. Therefore, in many chemical reactions in which there is a tendency toward extreme temperature change it is desirable to provide means whereby the reactions are more nearly isothermal rather than adiabatic. For example, it is common practice to allow an exothermic chemical reaction to proceed in a single reactor until the temperature increases to a predetermined value. The reactants are then taken from the reactor and mixed with a cooling fluid in a pipe by use of an eductor to reduce the temperature of the reactants to a desired level. This cooling operation is known as "quenching." The reactants then are passed into another reactor and the above cycle is repeated until the reaction is completed. This procedure has the disadvantage that several reactors are required to carry the reaction to completion, and in addition an undesirable, large pressure drop is introduced into the reactant flow stream by the use of eductors, or the like, to obtain the intimate mixing necessary for adequate quenching. Furthermore, no way is provided for controlling the temperature of the reaction within the reactor.

The present invention overcomes these disadvantages by providing novel method and apparatus for conducting a catalytic reaction in a single reactor at a high rate without damaging the catalyst or interfering with the reaction. This is accomplished by passing the reactants (feed stock) and products serially through a series of separate catalyst beds in a single reactor and supplying a fluid to the reactants and products intermediate the beds as required to maintain the desired operating temperature. The catalyst beds are all contained in a single reactor vessel for economy, and means are provided intermediate the catalyst beds for introducing fluid into the reactor independent of the reactants and products so that temperature within the vessel can be controlled as the chemical reaction progresses. The separate catalyst beds are arranged within the reactor so that the reactants flow radially through the beds. In the case of exothermic chemical reactions the temperature-controlling fluid is at a lower temperature than the reactants and products and is used to prevent the reaction temperature from exceeding a predetermined value. The present invention is equally suitable for maintaining reaction temperatures of endothermic reactions by adding to the reactants and products a fluid which is at a higher temperature than the reactants and products.

Preferably, the catalyst beds are disposed within the reactor so as to provide a minimum pressure drop to the fluids passing through the catalyst.

The present invention contemplates a reactor consisting of a closed vessel having fluid inlet and outlet ports. A plurality of walls are provided within the vessel for dividing it into separate compartments. Conduit means are provided to interconnect the compartments so that fluid introduced through the inlet port flows serially through the compartments and out the outlet port. Means are provided within the compartments for supporting catalyst beds. The vessel is provided with means for introducing fluid into at least one of the compartments independent of the fluid introduced through the inlet port of the vessel.

In a preferred form of the invention the relative size of the compartments is predetermined as a function of desired contact time and temperature change as affected by the reaction for which the particular reactor is designed. For example, variations in the flow rate of fluids through the reactor may result from the addition of fluid independent of the reaction products, or from the change in volume of the reactants. Also, if a large number of compartments are employed, means are provided for scheduling fluid flow through the compartments to keep at a minimum the pressure differential across the walls separating the compartments.

These and other aspects of the invention will be more clearly understood in the light of the following detailed description taken in conjunction with the accompanying drawings in which:

Fig. 1 is a top plan view of a presently preferred embodiment of the invention;

Fig. 2 is a bottom plan view of the apparatus of Fig. 1;

Fig. 3 is a vertical section taken on line 3—3 of Fig. 1;

Fig. 4 is a horizontal section taken on line 4—4 of Fig. 3;

Fig. 5 is a horizontal section partly broken away taken on line 5—5 of Fig. 3;

Fig. 6 is an enlarged view taken at line 6—6 of Fig. 3;

Fig. 7 is a horizontal section taken on line 7—7 of Fig. 3;

Fig. 8 is a partly schematic top plan view of another embodiment of the invention illustrating a method for "balancing" the pressure drop across compartment walls, and for compensating for volumetric changes resulting from the chemical reaction conducted in the reactor;

Fig. 9 is a vertical section taken on line 9—9 of Fig. 8, partly broken away; and Fig. 10 is a vertical section taken on line 10—10 of Fig. 8.

Referring to Figs. 1 through 7, which illustrate a presently preferred embodiment of the invention, an elongated cylindrical vessel 11 is disposed in a substantially vertical position, and closed at each end by closures 11A, 11B rigidly attached to the vessel by any convenient means, for example, by welding. Three walls 12, 13, 14 are disposed radially within the vessel to extend from a common juncture at the center of the vessel to its cylindrical wall. The walls, which are spaced at 120° intervals, extend from one end of the vessel to the other and are sealed against the walls of the vessel so that the vessel is divided into three elongated radial compartments 15, 16, 17 of equal volume.

A top horizontal sector-shaped plate 18 is welded to walls 12 and 14 near the upper end of compartment 15 and extends from the juncture of these walls to a point intermediate the axis of the vessel and the vessel wall so that an opening is left between the outer arcuate edge of the plate and the cylindrical wall of the vessel. A bottom horizontal sector-shaped plate 20 is welded to walls 12, 14 and the cylindrical wall of the vessel near the lower end of compartment 15. The inner portion of this plate is cut away on a radius centered at the juncture of the three radial walls, as illustrated most clearly in Fig. 5, so that a sector-shaped opening is formed between the inner edge of the plate and the two adjoining walls.

In compartment 16 a top horizontal sector-shaped plate 21 is welded to walls 12, 13 and the cylindrical wall of the vessel near the upper end of compartment 16. The inner portion of plate 21 is cut away on a radius centered at the juncture of the three radial walls so that a sector-shaped opening is formed between plate 21 and walls 12, 13. A bottom horizontal sector-shaped plate 22 is welded to walls 12, 13 near the lower end of compartment 16. The plate is of such radius that an opening is left between its outer arcuate edge and the cylindrical wall of the vessel.

In compartment 17 a top horizontal sector-shaped plate 24 is welded to walls 13, 14 near the upper end of compartment 17. The radius of plate 24 is such that an opening is left between its outer arcuate edge and the cylindrical wall of the vessel. A bottom horizontal sector-shaped plate 26 is welded to walls 13, 14 and the cylindrical wall of the vessel near the lower end of compartment 17. The inner portion of plate 26 is cut on a radius centered at the juncture of the radial walls so that a sector-shaped opening is formed between the inner edge of plate 26 and walls 13, 14.

Vertical catalyst filling ducts 28, 29, 30 are provided in each of compartments 15, 16, 17, respectively, and extend respectively from openings 31, 32, 33 in the top plate of each of the respective compartments through the upper end wall of the vessel. Each of the filling ducts is provided with removable covers 36, 37, 38 respectively, flanged to the ducts. Preferably the ducts are sufficient in diameter to provide manways for access into the compartments. On small reactors, separate manways (not shown) are provided.

Vertical catalyst dumping ducts 39, 40, 41 are provided in compartments 15, 16, 17, respectively, and extend from respective openings 42, 43, 44 in the bottom of each of the compartments through the lower end wall of the vessel. Each of the catalyst dumping ducts is provided with removable covers 48, 49, 50, respectively, flanged to the ducts.

A feed inlet 51 is provided through the upper end wall of the vessel to supply feed (reactants) to compartment 15. A product outlet 52 is provided in the lower end wall of the vessel at the lower end of compartment 17.

An outer wire screen 53 is disposed around the periphery of plate 18 in compartment 15 and extends vertically to plate 20 so that an outer well 54 in the form of an annular segment is left between the screen and the cylindrical wall of the vessel. An inner wire screen 55 is disposed around the inner periphery of plate 20 of compartment 15 and extends vertically to plate 18 defining with the outer screen and plates 18, 20 a catalyst bin 56. A central well 57 is formed between the inner wire screen 55 and the juncture of walls 12 and 14. Corresponding wire screens 58, 59 in compartment 16 and 60, 61 in compartment 17 provide catalyst bins 62, 63 opening into central wells 64, 65 respectively, and outer wells 66, 67 respectively. Each of the bins is filled with a catalyst bed 68 as illustrated for bin 56 in Fig. 3.

Fig. 6 shows in detail the structure of the screens used to support the catalyst bed. Each screen is composed of a layer of fine screen 69 (approximately 10 mesh) supported by a stronger screen 70 (approximately 4 mesh). Each screen is oriented so that the fine mesh is exposed to direct contact with the catalyst.

Quench lines 71, 72, 73 are disposed approximately in the center of each of central wells 57, 64, 65 respectively, and extend through the bottom end wall of the vessel to approximately the inner surface of each of the top plates in the respective compartments. The quench lines conveniently are pipes perforated throughout their entire length and capped at their upper ends. Preferably, the perforations are arranged so that the quench fluid is directed against the vertical walls, i. e., away from the catalyst bed. This is particularly desirable if the reactants are gaseous and the quench fluid is liquid. Suitable sealing means (e. g. welding) are provided around each of the quench lines where they pass through walls or plates. The quench lines are connected to a source (not shown) of fluid which may be introduced into the central wells of each compartment to maintain the desired temperature.

The portion of wall 12 extending below bottom plates 20, 22 is cut away to provide an opening 74 so that compartments 15, 16 are interconnected. The portion of wall 13 extending above upper plates 21, 24 is also cut away to provide an opening 75 so that compartments 16, 17 are interconnected.

The flow of fluid through the apparatus of Figs. 1 through 6 is as follows:

Feed stock is introduced through the feed inlet into compartment 15 and flows into the outer well 54 and radially through the catalyst bed in bin 56 into the central well of the compartment. From the central well the fluid flows through the opening in wall 12 and into the outer well of compartment 16. The fluid then passes radially through the catalyst bed in bin 62 into central well 64 up to the upper portion of the compartment, through the opening in wall 13 into outer well 67 and radially through the catalyst bed in bin 63 to the central well 65 and out the product discharge line.

The above described reactor is suitable for many types of catalytic reaction, as for example, catalytic desulphurization of gasoline. The catalyst filling and dumping ducts permit the ready filling and emptying of the various catalyst bins with conventional catalysts, such as ⅛" pellets of cobalt molybdate, which is used for the desulphurization of gasoline. With the above described reactor and the cobalt molybdate catalyst, a high sulphur feed stock, for example, 100–400° F. ASTM gasoline containing 2–3% sulphur is efficiently desulphurized. The reaction is conducted at a pressure of 650 to 750 lbs. per square inch gage and at a temperature of 600° F. With a reactor embodying the present invention, a high through-put rate can be achieved because the temperature rise within the reactor can readily be limited to 50° F. by using the quench lines to introduce a quenching fluid such as a low sulphur naphtha or recycled hydrogen gas. This permits the reaction to be run at a high rate with no danger of excessive temperatures developing to injure the catalyst or interfere with the reaction.

Figs. 8, 9 and 10 show in a partly schematic form a modification of the present invention in which the vessel is divided into more than three compartments and in which the compartments are made of different sizes to accommodate reactions in which it is desired to control the contact time of product and reactants as the reaction progresses. From the foregoing description of the apparatus shown in Figs. 1 through 6, it will be apparent that if the reactor were divided into numerous compartments and the fluid were passed progressively through an adjacent catalyst bin, that the pressure differential existing between the wall dividing the first and last compartments might become excessively high. The arrangement in Figs. 8–10 illustrate how this difficulty is avoided.

A cylindrical vessel 80 closed at each end is divided into four compartments 81, 82, 83, 84 by radial walls 85, 86, 87, 88 extending from a common juncture at the center of the vessel throughout the length of the vessel and sealing against the side and end walls of the vessel. As described in detail below, the four compartments are connected so that fluid flow through them is in the following order: 81, 82, 84, 83.

Top and bottom plates 89, 90 are disposed within compartment 81 in the same manner as that described for the apparatus shown in Figs. 1 through 7 so that space is left between the outer arcuate edge of top plate 89 and the cylindrical wall of the vessel; and an inner space is left between the inner edge of the bottom plate and the juncture of walls 85, 88.

An outer wire screen 91 is disposed around the periphery of top plate 89 and extends parallel to the vessel wall to the top of bottom plate 90 so that outer well 92 is left between the screen and the vessel wall. An inner wire screen 93 is disposed around the periphery of bottom plate 90 and extends parallel to the outer screen to the bottom of top plate 89 so that a catalyst bin 94 is defined between the top plate, bottom plate, outer screen, and inner screen. An inner well 95 defined by the inner screen, the inner portion of top plate 89 and inner portion of walls 85, 88 is substantially open to the bottom of compartment 81.

The arrangement in compartment 84 is substantially identical to that of compartment 81, with a top plate 96, a bottom plate 97, an outer screen 98, and an inner screen 99 disposed to form an outer well 100, a catalyst bin 101, and an inner well 102.

In compartment 82 top and bottom plates 103, 104, are disposed so that a space is left between the inner arcuate edge of top plate 103 and the juncture of walls 85, 86 and an outer space is left between the outer arcuate edge of bottom plate 104 and the cylindrical wall of the vessel.

An outer wire screen 105 is disposed around the periphery of bottom plate 104 and extends parallel to the vessel wall to the underside of top plate 103 so that an outer well 106 is left between the screen and the vessel wall. An inner wire screen 107 is disposed around the inner periphery of top plate 103 and extends parallel to the outer screen to the top side of bottom plate 104 so that a catalyst bin 108 is defined between the top plate, bottom plate, outer screen and inner screen. An inner well 109 defined by the inner screen, the inner portion of bottom plate 104 and inner portion of walls 85, 86 is substantially open to the top of compartment 82.

The arrangement in compartment 83 is substantially identical to that of compartment 82, with a top plate 110, a bottom plate 111, an outer screen 112, and an inner screen 113 disposed to form an outer well 114, a catalyst bin 115, and an inner well 116.

The lower portion of wall 85 below bottom plates 90, 104 is provided with an opening 117 to provide a passageway from compartment 81 to compartment 82. The lower portion of wall 87 below bottom plates 97, 111 is provided with an opening 118 to provide a passageway between compartments 83, 84. A balancing cross-over flow line 119 exterior of the reactor connects the upper portion of compartment 82 with the upper portion of compartment 84.

Quench lines 120, 121, 122, 123 are disposed approximately in the center of each of inner wells 95, 109, 116, 102, respectively, and extend through the bottom end wall of the vessel to approximately the inner surface of each of the top plates in the respective compartments. As with the quench lines in the reactor illustrated in Figs. 1 through 7, the quench lines 120 through 123 conveniently are pipes perforated throughout their entire length and capped at their upper ends. Suitable sealing means are provided around each of the quench lines where they pass through walls or plates. The quench lines are connected to a source (not shown) of fluid which may be introduced into the inner well of each compartment to maintain the desired temperature. The vessel 80 is provided with a fluid inlet line 124 and an exhaust line 125 opening respectively into compartments 81, 83.

The distinguishing features of the reactor embodiment shown in Figs. 8, 9 and 10 are the use of a cross-over line to connect two non-adjacent compartments, and compartments of unequal volume. That is, inlet compartment 81 is the smallest, the next compartment 82 to receive the feed is the next smallest, the next compartment 84 to receive the feed is larger than the preceding compartment and the final compartment 83 to receive the feed is the largest of the four compartments. This arrangement is desirable when a chemical reaction is being conducted such that total volume of the reactants, products and added quench fluid increases progressively.

For simplicity, the catalyst and the various catalyst filling and dumping ducts ordinarily associated with the reactor shown in Figs. 8, 9 and 10 are not shown.

The operation of the apparatus of Figs. 8, 9 and 10 is as follows:

Feed stock is introduced into the top of compartment 81 through feed line 124 and flows down the outer well of compartment 81. The fluid then flows radially through the catalyst bed in bin 94 to the inner well of compartment 81 and sequentially through compartments 82, 84, 83 from outer to inner well of each compartment.

Cross-over line 119 by-passes fluid flow around compartment 83 so that the total pressure drop in the system will not appear across a given interior wall. Without the by-pass and with fluid flow serially through compartments 81, 82, 83, 84, in that order, the entire system pressure drop would appear across wall 88. Where any appreciable pressure drop is involved, such a situation is preferably avoided, as for example, in the manner illustrated to simplify construction. For the purpose of describing the invention, the term "serially" is used to mean that fluid flowing through the reactor passes through all of the compartments, although not necessarily in any given sequence.

The quench lines described in the above embodiments of the invention can be used to introduce fluid of any nature, for example, reactants can be introduced to the catalyst beds through the quench lines.

Considerable flexibility can also be achieved by adjusting the height of individual catalyst beds to control contact time and pressure drop in the beds.

This invention provides features which are not available in other reactors. For example, intimate and rapid mixing of the quench fluid and reactants is obtained because the quench fluid is introduced over a large area and appreciable dispersion of the quench fluid results from impingement on the compartment walls which act as baffles. This efficient quench permits close temperature control of the reaction within the reactor. Another important advantage is that the intimate mixing is achieved with a low pressure drop in the quench chamber as well as in the catalyst beds.

We claim:

1. A reactor comprising a vessel having a first fluid inlet port and an outlet port, a plurality of walls radially disposed within the vessel dividing it into separate sector-shaped compartments, the walls being provided with openings adjacent their ends to form passageways interconnecting the compartments, a sector-shaped end plate secured between adjacent radial walls adjacent each end of each compartment and inwardly from said openings to form a catalyst chamber in each compartment between the respective end plates, the end plates defining with the walls openings from each catalyst compartment into opposite ends of the reactor, the openings in the end plates and in the walls being arranged to cause fluid introduced into the inlet port to flow radially and successively through each compartment and out the outlet port, a second inlet port for introducing a second fluid independently of the fluid flow through the first inlet port and distribution means communicating with the second port and extending substantially the entire length of at least one of the compartments for introducing said second fluid substantially throughout the length of said compartment to the first fluid as the first fluid emerges from the catalyst in said compartment.

2. A reactor comprising a vessel having fluid inlet and outlet ports, a plurality of inner walls radially disposed within the vessel dividing it into separate sector-shaped compartments, the inner walls being provided with openings adjacent their ends to form passageways interconnecting the compartments, a sector-shaped end plate secured between adjacent inner walls adjacent each end of each compartment and inwardly from said openings to form a catalyst chamber in each compartment between the respective end plates, the end plates defining with the walls openings from each catalyst compartment into opposite ends of the reactor, the openings in the end plates and inner walls being arranged to cause fluid introduced into the inlet port to flow radially and successively through the compartments and out the outlet port, an outer arcuate perforate partition in at least one of the compartments extending between adjacent inner walls and end plates defining the compartment and spaced inwardly from the vessel wall to form a segment of an annular space, and an inner arcuate perforate partition in the same compartment as the outer partition extending between adjacent inner walls and from one end plate to the other, the inner partition being spaced from the outer partition to form a catalyst bin between the two partitions and to form a central well in the compartment.

3. Apparatus according to claim 2 which includes distribution means extending substantially the entire length of the center well for introducing substantially throughout the length of the center well a fluid different from that introduced through the fluid inlet port.

4. A reactor comprising a vessel having fluid inlet and outlet ports, a plurality of walls radially disposed within the vessel dividing it into separate sector-shaped compartments, the walls being provided with openings adjacent their ends to form passageways interconnecting the compartments, a sector-shaped end plate secured between adjacent radial walls adjacent each end of each compartment and inwardly from the openings to form a catalyst chamber in each compartment between the respective end plates, the end plates having openings therein communicating from each catalyst compartment into each end of the reactor, the plate and wall openings being arranged to cause fluid introduced in the inlet port to flow radially and successively through the several compartments in such sequence that the initial and final compartments are separated from each other by at least one intervening compartment.

References Cited in the file of this patent

UNITED STATES PATENTS

| | | |
|---|---|---|
| 2,244,599 | Banks | June 3, 1941 |
| 2,517,525 | Cummings | Aug. 1, 1950 |
| 2,680,125 | Herbert | June 1, 1954 |